March 16, 1965
L. D. ZIEGENHAGEN
3,173,252
RESTARTABLE ROCKET MOTOR
Filed March 23, 1962
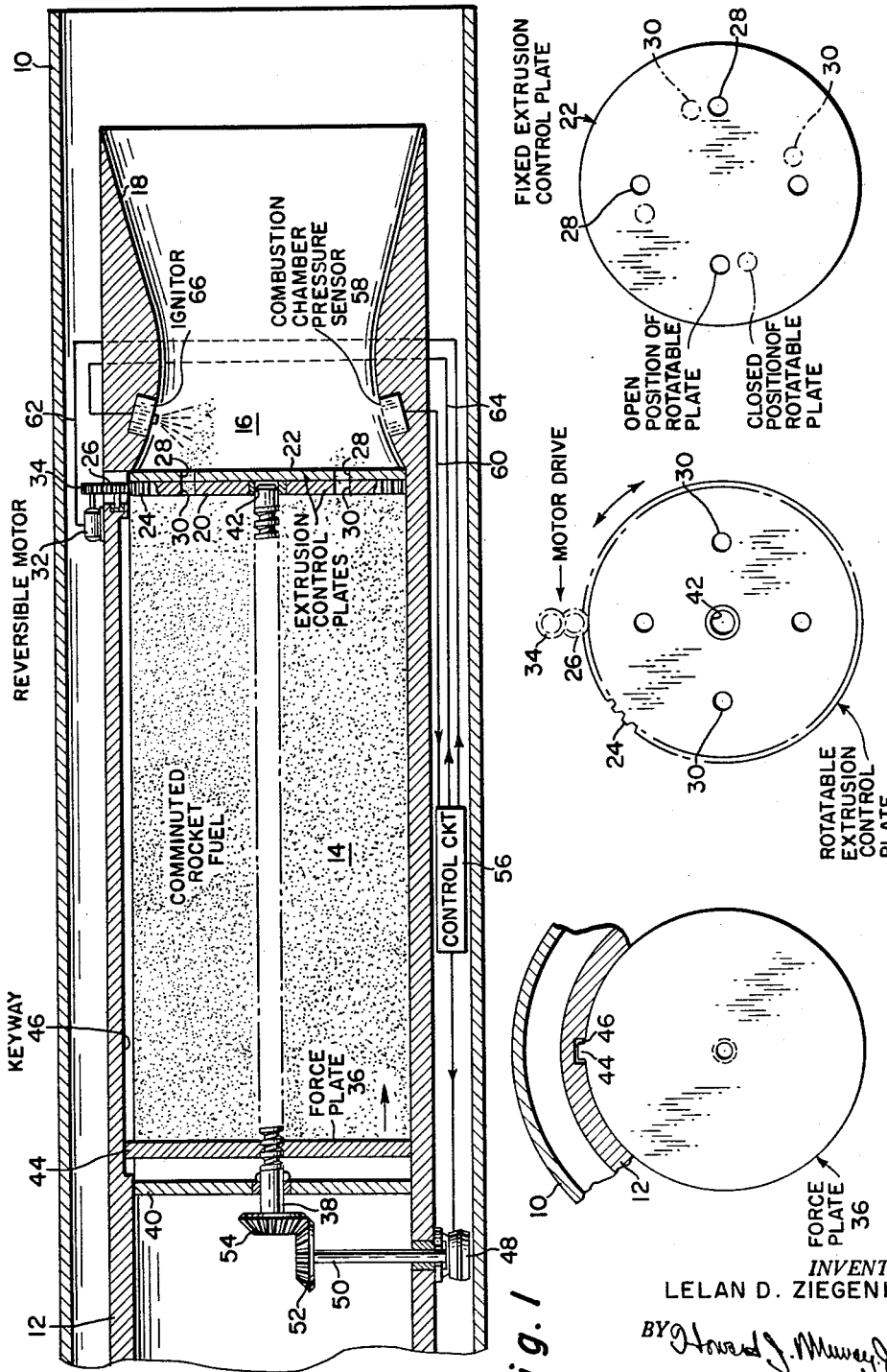
INVENTOR.
LELAN D. ZIEGENHAGEN

United States Patent Office 3,173,252
Patented Mar. 16, 1965

3,173,252
RESTARTABLE ROCKET MOTOR
Lelan D. Ziegenhagen, Silverado, Calif.
(Star Rte., Box 362, Orange, Calif.)
Filed Mar. 23, 1962, Ser. No. 182,146
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates in general to a rocket motor so designed as to be capable of intermittent operation. In particular, the present invention relates to a rocket motor utilizing solid fuel in comminuted form, which fuel is adapted to be controllably fed into the combustion chamber of the rocket such that a thrust is developed only for desired intervals during rocket flight.

At the present time, there exists a definite need for a rocket engine which can be selectively energized during certain flight periods and which remains inactive during other periods. An engine of this nature is more economical in its use of available fuel, and consequently may have a range considerably in excess of that achieved by rockets designed for continuous operation. In addition, the ability to controllably ignite and extinguish a solid fuel rocket motor renders the latter useful for directional control of the vehicle, and, specifically in the case of satellites, enables orbital corrections to be made following the launching thereof.

It is not too difficult to obtain the advantages of intermittent engine operation when the engine fuel is of liquid form. It is only necessary with such designs to provide means for periodically shutting off the injection of such liquid fuel into the combustion chamber of the rocket at the start of those periods when it is desired that the engine be inoperative. However, when solid fuels are employed for propulsion purposes, it has heretofore been difficult to bring about a similar type of operation, since once the solid fuel has been ignited it will normally burn until completely consumed. This is because solid fuels are customarily molded in one piece and incorporate a suitable binder which maintains the fuel in a particular form or shape selected in accordance with the dimensions of the rocket body within which it is to be contained. Once this solid "block" of fuel begins to burn, there is no practical way to extinguish such burning until the fuel supply is exhausted. It is not uncommon in such arrangements to have present cracks or breaks in this "block" which, when present, cause uneven burning of the fuel and consequently a variation in the amount of developed thrust. Still further, the extremely high temperatures resulting when such solid fuels are burned require casings or housings which are capable of resisting these thermal conditions. With respect to handling procedures for such products, it is recognized that the formation of a rocket fuel in one solid block does not allow any appreciable deviation from rigidly prescribed operations which can only be carried out by highly experienced technical personnel.

In accordance with a feature of present invention, solid fuel is employed in a re-startable rocket motor, but such solid fuel, rather than being in the form of a single block, is comminuted, pulverized, or otherwise reduced to a finely-divided state. This comminuted fuel is arranged to be fed into the combustion chamber of the rocket at a constant rate and for periods of time which are either predetermined or chosen in accordance with certain requirements which arise during rocket flight. Means are provided to control the extrusion of this comminuted fuel into the rocket combustion chamber, either as a function of combustion chamber pressure, at times which are pre-programmed to achieve a desired objective, or in response to radio command signals received during flight and intended to effect some particular rocket action which cannot be foreseen prior to launching.

Important advantages attained through the use of a rocket designed in accordance with the present teaching include greatly reduced requirements insofar as handling procedures for the fuel are concerned, since the latter is not fabricated in any particular size or configuration. It can therefore be transported in bulk form and easily inserted into the rocket at the launching site. Inexperienced personnel may carry out these functions. Uneven burning of the fuel is not a problem, as it is in "block" arrangements, and, as will subsequently be seen, combustion of the fuel may be terminated quickly and easily by a relatively simple mechanical valve. Inasmuch as the pulverized fuel is not formed or molded into any specific shape, no binder is necessary. Most importantly, however, the efficiency of fuel consumption as a function of derived thrust is high, making for what might in effect be termed low total mass per impulse.

One object of the present invention, therefor, is to provide a restartable rocket motor utilizing solid fuel.

A further object of the invention is to provide a re-startable rocket motor in which a solid fuel in granular form is periodically extruded into the combustion chamber of the rocket motor during those periods when the development of a thrust force is required.

An additional object of the present invention is to provide a restartable rocket motor utilizing solid fuel in comminuted form, this motor incorporating a mechanical valve which is selectively actuatable between open and closed positions so as to correspondingly control the extrusion of the fuel in a manner which may be either pre-programmed, a function of combusion chamber pressure, or a function of command signals received by the rocket during flight.

Other objects and many of the attendant advantages of this invention will be readily appreciated as the same becomes better understood by reference to the following detailed description when considered in connection with the accompanying drawings, wherein:

FIG. 1 is a partly sectional longitudinal view of a rocket motor designed in accordance with a preferred embodiment of the present invention;

FIGS. 2 and 3 respectively are plan views of certain components of the rocket motor of FIG. 1; and FIG. 4 is a partly sectional transverse view of a portion of FIG. 1, illustrating the relationship between certain components thereof.

Referring now to the drawing, there is shown in FIG. 1 a partly sectional longitudinal view of a rocket motor which incorporates a more or less conventional outer shell 10 of tubular configuration. Within this shell 10, and concentrically arranged with respect thereto, is a generally tubular rocket motor body 12 which includes a fuel compartment 14 and a combustion chamber 16. In the usual fashion, the outlet of the combustion chamber 16 is restricted in diameter thereby to establish a nozzle 18 through which the exhaust gases from combustion chamber 16 pass.

Within the fuel compartment 14 of the rocket motor of FIG. 1 is a supply of solid rocket fuel in comminuted form. This rocket fuel in chamber 14 is of any suitable chemical composition, and is ground or otherwise reduced to fine particles. It is contemplated that this rocket fuel be powdered or pulverizel, although, depending upon its chemical nature, it may be sufficient to merely reduce the solid fuel particles to a size comparable to fine sand.

Interposed between the fuel compartment 14 of the rocket motor and the combustion chamber 16 is a pair of transverse plates 20 and 22 disposed in face-to-face relation as illustrated in the drawing. The plate 22 is rigidly fixed in position to form the forward wall of the combustion chamber 16, while the plate 20 is arranged for limited angular rotation about the longitudinal axis of the rocket motor. To bring about such a limited rotation in a manner which will be subsequently described, the periphery of the rotatable plane 20 is provided with teeth 24 (also shown in FIG. 3) which are intended to mesh with a gear 26 rotatably carried by the rocket motor body 12.

The two plates 20 and 22 act as a unit to selectively control the extrusion into combustion chamber 16 of the comminuted rocket fuel contained in compartment 12 and hence in effect constitute a mechanical valve. To bring about such action, each of the plates 20 and 22 is provided with a plurality of apertures therein. Those apertures in the fixed extrusion control plate 22 are designated in the drawing by the reference numeral 28, and one possible arrangement is perhaps best shown in FIG. 2, where they are depicted as being evenly spaced and arranged symmetrically with respect to the axis of the rocket motor. As shown in FIG. 3, the apertures or openings 30 in the rotatable extrusion control plate 20 are arranged in a manner identical to that of the openings 28 in plate 22, so that, upon a selective rotation of the control plate 20 in a manner to be later described, the openings 30 in plate 20 will either line up with the openings 28 in plate 22 or will be off-set therefrom (as shown by the broken lines in FIG. 2). In the latter event, the fuel compartment 14 of the rocket motor will be closed off from the combustion chamber 16.

Rotation of the extrusion control plate 20 is accomplished through selective electrical energization of a reversible motor 32 which is mounted on the rocket motor body 12 and lies in the space between such body and the outer shell 10 of the projectile. This motor 32 has an output shaft on which is carried a gear 34 meshing with gear 26, the latter in turn engaging the teeth 24 of the rotatable plate 20. Consequently, upon selective energization of motor 32, the plate 20 will be rotated through a limited angle, as indicated by the arrows in FIG. 3 of the drawing.

From the above description, it will be recognized that when the openings 28 and 30 in their respective extrusion control plates 22 and 20 are aligned with one another, the comminuted fuel in compartment 14 may pass through such aligned openings into the combustion chamber 16 of the rocket motor. However, when these openings 28 and 30 are not so aligned (see FIG. 2) then no such passage of fuel into the combustion chamber can take place.

At the opposite end of the compartment 14 from that at which the plates 20 and 22 are located is a further plate 36. This plate 36 is intended to move longitudinally or rearwardly along the axis of the rocket motor as shown by the arrow. Consequently, if the compartment 14 is filled with comminuted rocket fuel, rearward movement of the plate 36 (to the right as shown in the drawing) will force the rocket fuel through the openings 28 and 20 when such openings are aligned. To cause such movement of the plate 36, the latter (hereinafter designated as the "force" plate) is threaded to a similarly threaded shaft 38 which lies on the longitudinal axis of the assembly as shown and is carried at one end in a fixed support plate 40. The other end of the shaft 38 is freely rotatable in a central opening 42 in the extrusion control plate 20. It will thus be seen that rotation of the threaded shaft 38 will result in the force plate 36 moving axially of the assembly, and, if this direction of rotation of shaft 38 is properly chosen, such movement of the force plate 36 will be in the direction of the arrow. To preclude angular rotation of plate 36, such plate is provided with a key 44 receivable in a slot 46 formed longitudinally in the rocket motor body 12 (see FIG. 4).

Rotation of shaft 38 is brought about through the electrical energization of a unidirectional motor 48 carried on a rocket motor body 12 in the space between such body and the outer shell 10. Motor 48 turns an output shaft 50 on which is mounted a bevel gear 52 engaging a second bevel gear 54 affixed to one end of shaft 38. Energization of motor 48 will thus result in a rotation of shaft 38 and consequent axial movement of the force plate 36.

To bring about an intermittent operation of the described rocket motor, the fuel in compartment 14 is periodically extruded into the combustion chamber 16 during those periods when a thrust force from the engine is desired. As hereinabove mentioned, such extrusion occurs when the plate openings 28 and 30 are aligned and when the fuel is forced through such aligned openings by pressure of the force plate 36. The operating intervals during which such combustion occurs may be chosen for a predetermined cycle or sequence, or they may be determined subsequent to the launching of the rocket and command or control signals transmitted thereto from a ground station or from another airborne vehicle.

Although the type of command or control apparatus for use with the mechanism above described is optional, there has been shown in FIG. 1 an electrical control circuit 56 (which may include components responsive to certain pre-programmed data) and which is capable of developing output energy for selective energization of the extrusion control plate motor 32 and the force plate movement motor 48. Since the details of the control circuit 56 form no part of the present invention, the arrangement has been illustrated only schematically. However, it might be helpful to state that the control circuit 36 could be responsive, for example, to the pressure present in the combustion chamber 16 to thereby regulate the extrusion of fuel at times when such combustion chamber pressure drops below a certain predetermined level. For example, associated with the combustion chamber 16 may be a conventional pressure-sensing unit 58 which transmits combustion chamber pressure information to the control circuit 56 over a conductor 60. When this information indicates that the rocket motor should be restarted following an interruption thereof, the control circuit 56 will develop an output signal which is transmitted to the motor 32 over conductor 62. Motor 32 then rotates the control plate 20 to bring about an alignment of the openings 28 and 30. At the time such alignment occurs (or prior thereto), the control circuit 56 also energizes the motor 48 to cause a longitudinal movement of the plate 36, which movement forces comminuted fuel through the aligned openings into the combustion chamber 16. As this fuel enters chamber 16, still further control energy is transmitted over a conductor 64 to an ignitor 66 which is preferably of the conventional flame type. The flame from ignitor 66 produces combustion of the extruded fuel and thus another cycle of rocket motor operation begins.

Termination of this operating cycle may be achieved either through information received from the sensing unit 58, as a result of command signals received from a remote point by means included in the rocket's guidance system (not shown), or from pre-programmed data built into the control circuit 56 in a known manner. Regardless of the type of control employed, however, it is only necessary to bring about a rotation of the control plate 20 so that the openings 28 and 30 are no longer aligned, whereupon extrusion of fuel ceases and combustion consequently terminates.

Although combustion in chamber 16 has been described as being initiated by a flame-type ignitor 66, other types of ignitors may obviously be substituted therefor. For example, it is possible to use devices of the capacitor-discharge type, or, alternatively, various conventional hypergolic firing arrangements.

Obviously many modifications and variations of the present invention are possible in the light of the above teachings. It is therefore to be understood that within the scope of the appended claim the invention may be practiced otherwise than as specifically described.

I claim:

In combination: A rocket motor body of generally tubular configuration; a shell surrounding said rocket motor body, said shell also being of generally tubular configuration, of greater diameter than said motor body, and coaxially arranged with respect to the latter so as to be circumferentially spaced therefrom; said rocket motor body including a combustion chamber and an outlet nozzle associated therewith; a fuel compartment within said rocket motor body, said compartment being located forwardly of said combustion chamber; a solid fuel within said compartment, said fuel being in comminuted form; a pair of transverse fuel-extrusion-control plates separating said fuel compartment from said combustion chamber, one of said plates being fixed in position and the remaining plate being selectively rotatable through a limited angle with respect to said one plate, each plate of said pair being formed with a plurality of correspondingly-located apertures therein, a further transverse fuel pressure plate located at the forward end of said fuel compartment, said fuel pressure plate being movable axially of said rocket motor toward said fuel extrusion control plates, means, including a first electrically-energizable drive motor disposed in the space between said tubular shell and said rocket motor body, for selectively moving said fuel pressure plate so as to urge the fuel in said compartment toward said extrusion control plates, power-generating means, including a second electrically-energizable drive motor disposed in the space between said tubular shell and said rocket motor body, for bringing about a selective relative movement between said pair of fuel-extrusion-control plates to thereby align the respective apertures formed therein and permit extrusion of fuel from said compartment through such aligned apertures into said combustion chamber, means for coordinating the operation of the said power-generating means for bringing about a selective relative movement between said pair of fuel-extrusion-control plates and said means for selectively moving said fuel pressure plate toward said fuel-extrusion-control plates, an ignitor located within said combustion chamber, means for controlling the operation of said ignitor as a function of the operation of said coordinating means, means for sensing the pressure in said combustion chamber, and means for applying the output of said combustion chamber pressure-sensing means to control the operation of said coordinating means.

References Cited by the Examiner

UNITED STATES PATENTS

| | | | |
|---|---|---|---|
| 1,532,930 | 4/25 | O'Neill | 60—39.47 |
| 2,847,869 | 8/58 | Hogan et al. | 60—6 |
| 2,926,613 | 3/60 | Fox | 60—35.6 |
| 2,945,344 | 7/60 | Hutchinson | 60—39.47 |
| 2,952,122 | 9/60 | Fox | 60—35.6 |
| 2,971,097 | 2/61 | Corbett | 60—39.48 |
| 3,017,745 | 1/62 | Shirley | 60—35.6 |
| 3,023,573 | 3/62 | Friedman | 60—39.47 |
| 3,025,668 | 3/62 | Mock | 60—39.27 |
| 3,046,736 | 7/62 | Thomson | 60—39.48 |
| 3,067,574 | 12/62 | Corbett | 60—39.48 |
| 3,070,565 | 12/62 | McKinnon | 60—39.47 |
| 3,073,113 | 1/63 | Faught | 60—39.47 |
| 3,084,504 | 4/63 | McKinnon | 60—35.6 |
| 3,105,352 | 10/63 | Corbett | 60—35.6 |

SAMUEL LEVINE, *Primary Examiner.*